US009283483B2

(12) United States Patent
Mizuki et al.

(10) Patent No.: US 9,283,483 B2
(45) Date of Patent: Mar. 15, 2016

(54) POSTED INFORMATION SHARING SYSTEM, GAME APPLICATION EXECUTING SYSTEM, STORAGE MEDIUM, AND INFORMATION-PROCESSING METHOD

(71) Applicant: NINTENDO CO., LTD., Kyoto (JP)

(72) Inventors: Kiyoshi Mizuki, Kyoto (JP); Hideki Konno, Kyoto (JP); Hideto Yuzawa, Kyoto (JP); Shunsaku Kato, Kyoto (JP)

(73) Assignee: Nintendo Co., Inc., Kyoto (JP)

( * ) Notice: Subject to any disclaimer, the term of this patent is extended or adjusted under 35 U.S.C. 154(b) by 89 days.

(21) Appl. No.: 13/742,674

(22) Filed: Jan. 16, 2013

(65) Prior Publication Data

US 2013/0324257 A1    Dec. 5, 2013

(30) Foreign Application Priority Data

Jun. 1, 2012    (JP) .................................. 2012-126207

(51) Int. Cl.
| | |
|---|---|
| *A63F 13/00* | (2014.01) |
| *A63F 13/35* | (2014.01) |
| *A63F 13/30* | (2014.01) |
| *G06F 17/30* | (2006.01) |

(52) U.S. Cl.
CPC ................. *A63F 13/35* (2014.09); *A63F 13/12* (2013.01); *G06F 17/30283* (2013.01); *A63F 2300/556* (2013.01); *A63F 2300/5566* (2013.01)

(58) Field of Classification Search
CPC .............. A63F 2300/556; A63F 2300/5566; A63F 2300/572; A63F 13/30; A63F 13/31; A63F 13/35; G06F 17/30283

USPC ....................................................... 463/40–43
See application file for complete search history.

(56) References Cited

U.S. PATENT DOCUMENTS

| | | | | |
|---|---|---|---|---|
| 5,813,913 | A  * |  9/1998 | Berner et al. ................... | 463/40 |
| 5,828,843 | A  * | 10/1998 | Grimm et al. ................. | 709/228 |
| 6,128,660 | A  * | 10/2000 | Grimm et al. ................. | 709/227 |
| 6,322,451 | B1 * | 11/2001 | Miura ............................. | 463/42 |
| 6,352,479 | B1 * |  3/2002 | Sparks, II ...................... | 463/42 |
| 6,641,481 | B1 * | 11/2003 | Mai et al. ....................... | 463/42 |
| 6,755,743 | B1 * |  6/2004 | Yamashita et al. ............. | 463/42 |
| 7,311,608 | B1 * | 12/2007 | Danieli et al. ................. | 463/42 |

(Continued)

FOREIGN PATENT DOCUMENTS

| | | |
|---|---|---|
| EP | 1519531 | 3/2005 |
| WO | 2006/124922 | 11/2006 |
| WO | 2008/034145 | 3/2008 |

OTHER PUBLICATIONS

Nov. 25, 2013 European Search Report for EP 13151273.3, 9 pages.

(Continued)

*Primary Examiner* — Milap Shah
(74) *Attorney, Agent, or Firm* — Nixon & Vanderhye, P.C.

(57) ABSTRACT

An exemplary posted information sharing system includes: a game processing unit configured to execute a multiplayer game application through a plurality of users each using a terminal; a group formation unit configured to form a playgroup for playing the game application, wherein the game processing unit includes: a group formation request unit configured to output, to the group formation unit, a playgroup formation request that specifies a group, according to input of the terminals, wherein the group formation unit is configured to form the users of terminals that specify the same group into a playgroup, based on the specified group.

9 Claims, 9 Drawing Sheets

(56) References Cited

U.S. PATENT DOCUMENTS

| | | | |
|---|---|---|---|
| 7,621,813 B2* | 11/2009 | Bortnik et al. | 463/42 |
| 7,677,970 B2* | 3/2010 | O'Kelley et al. | 463/25 |
| 8,195,809 B2* | 6/2012 | Langan et al. | 709/227 |
| 8,821,297 B1* | 9/2014 | Nagata et al. | 463/42 |
| 2003/0224856 A1* | 12/2003 | Bukovsky et al. | 463/42 |
| 2004/0097287 A1* | 5/2004 | Postrel | 463/41 |
| 2004/0127289 A1* | 7/2004 | Davis et al. | 463/42 |
| 2004/0254809 A1 | 12/2004 | Teicher | |
| 2005/0192097 A1* | 9/2005 | Farnham et al. | 463/42 |
| 2006/0121989 A1* | 6/2006 | O'Kelley et al. | 463/42 |
| 2006/0121990 A1* | 6/2006 | O'Kelley et al. | 463/42 |
| 2006/0135264 A1* | 6/2006 | Shaw et al. | 463/42 |
| 2006/0143214 A1 | 6/2006 | Teicher | |
| 2006/0247055 A1* | 11/2006 | O'Kelley et al. | 463/42 |
| 2006/0258463 A1* | 11/2006 | Cugno et al. | 463/42 |
| 2006/0287096 A1 | 12/2006 | O'Kelley, II et al. | |
| 2007/0156664 A1 | 7/2007 | Norton et al. | |
| 2007/0173323 A1* | 7/2007 | Johnson et al. | 463/42 |
| 2007/0173324 A1* | 7/2007 | Multerer et al. | 463/42 |
| 2007/0173325 A1* | 7/2007 | Shaw et al. | 463/42 |
| 2007/0207860 A1* | 9/2007 | Yamauchi et al. | 463/42 |
| 2007/0218997 A1* | 9/2007 | Cho | 463/42 |
| 2008/0070697 A1* | 3/2008 | Robinson et al. | 463/42 |
| 2008/0242420 A1* | 10/2008 | Graepel et al. | 463/42 |
| 2009/0325709 A1* | 12/2009 | Shi | 463/42 |
| 2009/0325712 A1* | 12/2009 | Rance | 463/42 |
| 2011/0319175 A1* | 12/2011 | Jensen | 463/42 |
| 2012/0142429 A1* | 6/2012 | Muller | 463/42 |
| 2013/0102392 A1* | 4/2013 | Nakata et al. | 463/42 |
| 2013/0165206 A1* | 6/2013 | Guinn et al. | 463/20 |
| 2013/0165234 A1* | 6/2013 | Hall et al. | 463/42 |

OTHER PUBLICATIONS

Xbox Live, Listen Watch Control Play, xbox.com, Jan. 9, 2013, 2 pages.

Xbox Live, Japanese language, Jan. 9, 2013, 1 page.

\* cited by examiner

FIG. 8

| POST ID | TIMESTAMP | APP ID | USERNAME | COMMENT | BINARY DATA | TAG |
|---|---|---|---|---|---|---|
| 351245 | 2012/3/19 21:09 | AAA001 | TARO YAMADA | I GOT THE SECRET SWORD IN THE VILLAGE. | 010010000... | 53 HRS, VILLAGE |
| 351244 | 2012/3/19 18:15 | ABB007 | HANAKO SATO | MY TIME FOR STAGE 5 WAS 2:35:002! | 010111110... | 12 HRS, STAGE 5 |
| 351243 | 2012/3/19 16:25 | AAA001 | HANAKO SATO | I COULDN'T DEFEAT THE BOSS OF THE MOUNTAIN VALLEY. HE'S REALLY STRONG. | (NA) | 31 HRS, MOUNTAIN VALLEY |
| 351242 | 2012/3/19 14:55 | AAA001 | HANAKO SATO | I'M OUT OF THE VILLAGE! | (NA) | 29 HRS, VILLAGE |
| 351241 | 2012/3/19 11:31 | AAA001 | ICHIRO SUZUKI | THIS GAME IS GREAT. HIGHLY RECOMMENDED. | (NA) | 35 HRS, CHURCH |
| ... | ... | ... | ... | ... | ... | ... |

| COMMUNITY ID | TITLE | APP ID | ATTRIBUTE INFORMATION ||||
|---|---|---|---|---|---|
| | | | CREATOR | No. OF MEMBERS | URL |
| 000001 | "THE LEGEND OF XYZ" COMMUNITY | AAA001 | OFFICIAL | 3568 | http://www.shopserver.com/xyz-shop.htm |
| 000002 | THE LEGEND OF XYZ CLUB | AAA001 | HANAKO SATO | 251 | http://www.shopserver.com/xyz-shop.htm |
| 000003 | TEAM XYZ | AAA001 | John Smith | 1075 | http://www.shopserver.com/xyz-shop.htm |
| 000004 | "KARTING" COMMUNITY | ABB007 | OFFICIAL | 9248 | http://www.shopserver.com/cartrace-shop.htm |
| 000005 | RACING IS LIFE | ABB007 | ICHIRO SUZUKI | 26 | http://www.shopserver.com/cartrace-shop.htm |
| ... | ... | ... | ... | ... | ... |

# POSTED INFORMATION SHARING SYSTEM, GAME APPLICATION EXECUTING SYSTEM, STORAGE MEDIUM, AND INFORMATION-PROCESSING METHOD

CROSS REFERENCE TO RELATED APPLICATIONS

This application is based on and claims priorities under 35 USC 119 from Japanese patent applications No. 2012-126207, which was filed on Jun. 1, 2012.

FIELD

The technology herein relates to sharing posted information.

BACKGROUND AND SUMMARY

Information-processing devices that are able to communicate with other users using a communication function are known.

The present disclosure provides technology for activating communication in a playgroup of a posted information sharing service.

There is provided a posted information sharing system including: a game processing unit that executes a multiplayer game application through a plurality of users each using a terminal; a group formation unit that forms a playgroup for playing the game application; and a posted information sharing unit that receives and stores posted information from the terminals, and/or outputs posted information to the terminals, wherein the posted information sharing unit manages the posted information in a plurality of groups, and the posted information sharing unit includes: a posted information storage unit that manages and stores, in the groups, posted information that is generated based on input of the terminals; a posted information display unit that, according to a request from the terminals, displays the posted information on the terminals in the groups; and an identification information management unit that manages identification information of the groups, the game processing unit includes: a group formation request unit that outputs, to the group formation unit, a playgroup formation request that specifies a group, according to input of the terminals, wherein the group formation unit is configured to form the users of terminals that specify the same group into a playgroup, based on the specified group.

BRIEF DESCRIPTION OF THE DRAWINGS

Exemplary embodiments will be described with reference to the following drawings, wherein:

FIG. 8 shows an example of data registered in posted information database 212;

FIG. 11 shows an example of a generated community list.

DETAILED DESCRIPTION OF NON-LIMITING EXEMPLARY EMBODIMENTS

1. Configuration

Figure 1:
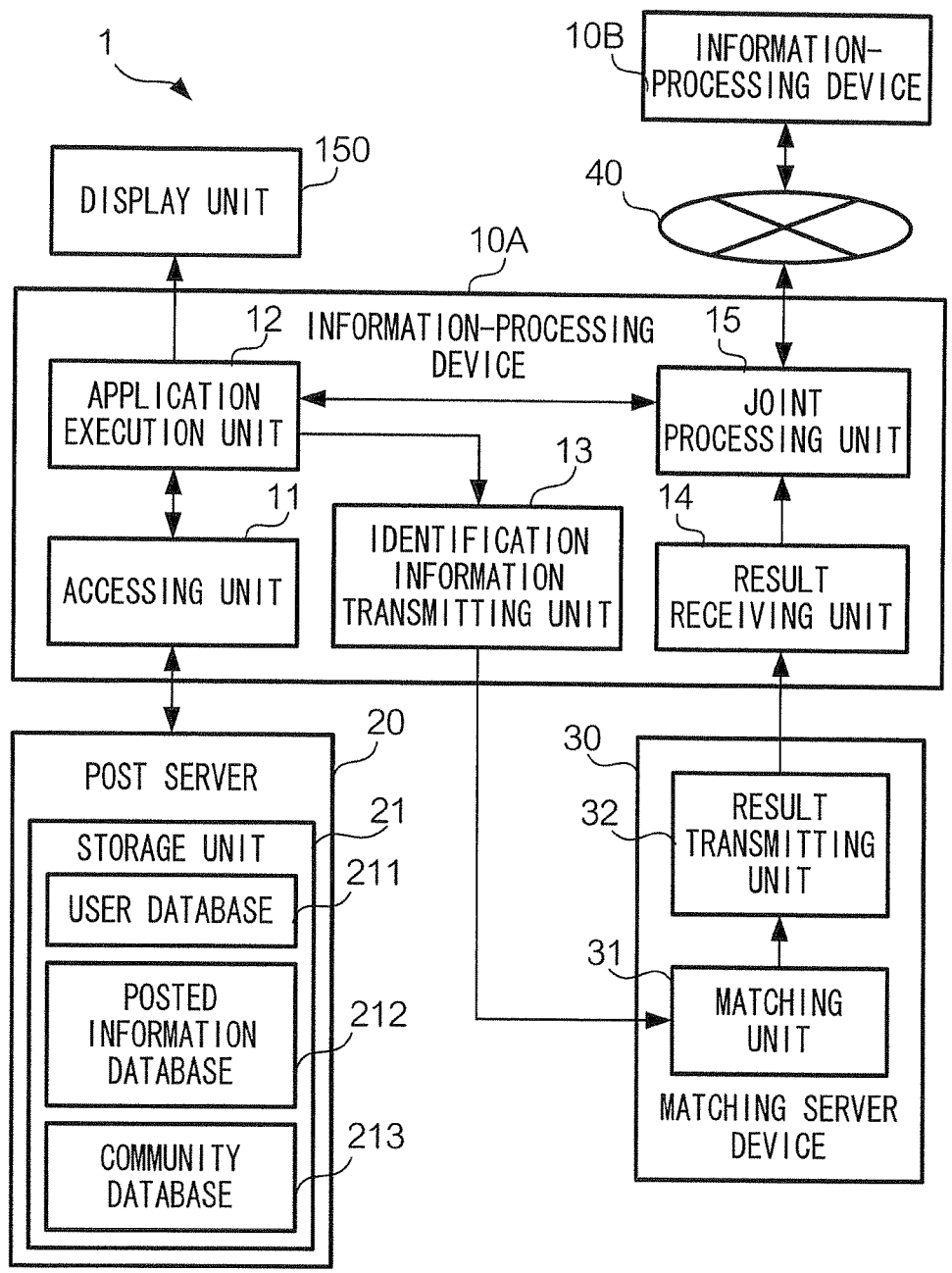
FIG. 1 shows an example of a configuration of information-processing system 1 according to one embodiment.

FIG. 1 shows an example of a configuration of information-processing system 1 according to one exemplary embodiment. Information-processing system 1 includes plural information-processing devices 10 (exemplary terminal devices), post server 20, matching server 30, and network 40. Plural information-processing devices 10 are connected via network 40. Network 40 is the Internet, for example. Here, in order to simplify description, only two information-processing devices 10 are shown. When distinguishing between plural information-processing devices 10, subscripts will be used, such as information-processing device 10A and information-processing device 10B. In information-processing system 1, plural information-processing devices 10 execute the same or corresponding application programs. These application programs are programs for implementing applications for performing joint processing from plural information-processing devices 10, such as an interactive fighting game, for example. In the present embodiment, an information-processing system that is realized by cooperative processing of plural information-processing devices is equivalent to a game processing unit, an information-processing system that is realized by cooperative processing of a posting server and plural information-processing devices is equivalent to a posted information sharing unit, and a matching server device is equivalent to a group formation unit.

1-1. Post Server 20

Post server 20 is a server device for providing a posted information sharing service. In this posted information sharing service, plural communities are formed for each application program. Posted information is grouped by community. A community is, for example, a group constituted by plural users (a set of plural users). Users belonging to a given community are called members of that community. In this example, one or more communities are provided for each application program. That is, n communities correspond to one application program (where n is a natural number of n≥1). Each community has an information exchange tool (e.g., electronic bulletin board system) for realizing communication between members. Member of a given community are able to exchange comments and messages with other members, via this information exchange tool. Post server 20 stores identification information (community ID) of each community.

In the posted information sharing service, posted information from each of the plural information-processing devices 10 specifies one of the communities and is transmitted to post server 20. Post server 20 includes storage unit 21 that stores user database 211, posted information database 212, and community database 213. Post server 20 groups and stores the posted information in accordance with the specified communities. Post server 20, according to a request from a specific information-processing device 10, provides posted information accumulated in posted information database 212 to information-processing device 10 from which the request originated. At this time, information-processing device 10 specifies one of the communities and makes a request. Post server 20 provides posted information for the specified community to information-processing device 10. Posted information includes character strings (text), handwritten characters or images serving as comments or messages input by a user.

User database 211 is a database in which user settings information of the posted information sharing service corresponding to each of plural user IDs is registered. User settings information includes settings information unique to the user, such as, for example, a list of identification information of the communities to which the user belong, restrictive conditions restricting posted information that is allowed to be display in each community, and a list of the user IDs of users who are friends with the user. The restrictive conditions that are used include, for example, time restrictions (e.g., only displaying posted information for the past one week), user restrictions (e.g., only displaying posted information of friends), and unrestricted (display all posted information).

Posted information database 212 is a database in which plural items of posted information are registered. The plural items of posted information each correspond to one of plural application programs.

Community database 213 is a database in which information relating to each of plural communities (attribute information) is registered. The plural communities each correspond to one or more application programs. That is, identification information of the application programs is stored in community database 213 as the attribute information of the communities. Community database 213 can be said to be a database in which information relating to the one or more communities corresponding to each of the plural application programs is stored.

Post server 20 is a computer device including a CPU, a memory, a storage (e.g., HDD (Hard Disk Drive)), and a communication interface. The storage stores a program for causing a computer device to operate as post server 20. The storage is an exemplary storage unit 21.

1-2. Information-processing Device 10

Information-processing device 10 includes accessing unit 11, application executing unit 12, and identification information transmitting unit 13. Accessing unit 11 accesses post server 20 and obtains posted information corresponding to a specified community. Application executing unit 12 executes application programs. Identification information transmitting unit 13 transmits, to matching server 30, community identification information for identifying a community that is subjected, among the one or more communities corresponding to the application program being executed by application executing unit 12. Community identification information is processed by matching server 30 as will be discussed later.

Information-processing device 10 further includes result receiving unit 14 and joint processing unit 15. Result receiving unit 14 receives, from matching server 30, the result of matching performed based on identification information transmitted by identification information transmitting unit 13. Joint processing unit 15 performs joint processing (communication processing) with another information-processing device 10 according to the result received by result receiving unit 14.

Figure 2:
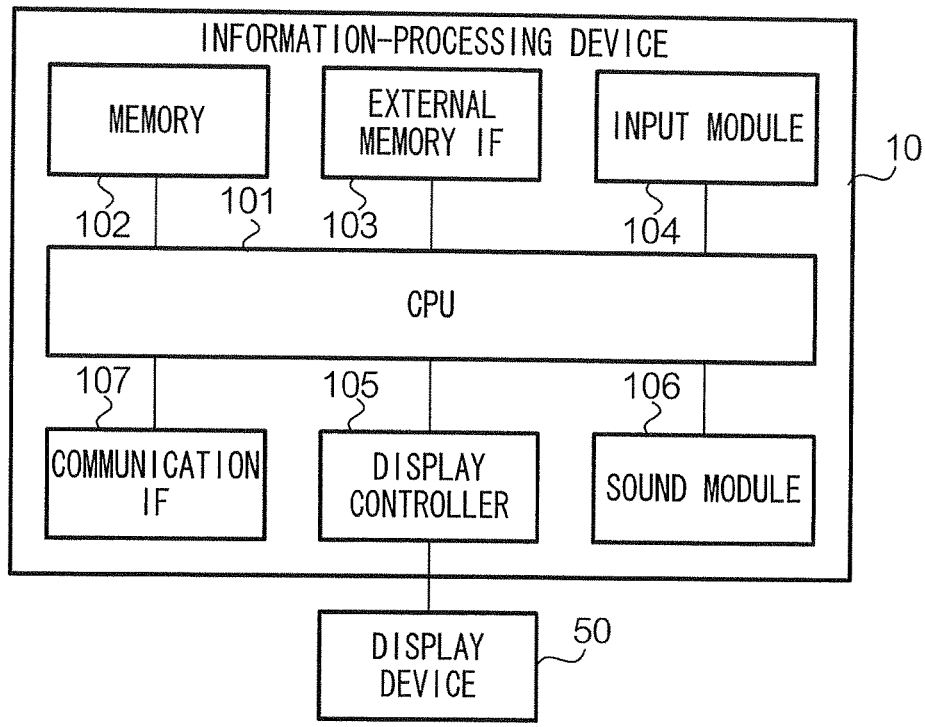
FIG. 2 shows an example of a hardware configuration of information-processing device 10.

FIG. 2 shows an example of a hardware configuration of information-processing device 10. In this example, information-processing device 10 is a game device for executing a video game. Information-processing device 10 is a computer device including CPU (Central Processing Unit) 101, memory 102, external memory IF 103, input module 104, display controller 105, sound module 106, and communication IF 107. Information-processing device 10 is connected to display device 50. Display device 50 is a device that displays information such as images and characters, and includes a display (liquid crystal panel, organic Electro-Luminescence (EL) panel, etc.) and a driver circuit. In this example, information-processing device 10 is a so-called console-type game device, and does not include display device 50. Display device 50 is an external device, such as a television receiver, for example. Note that information-processing device 10 may include display device 50.

CPU 101 is a device that controls the constituent elements of information-processing device 10, and performs various arithmetic operations. Memory 102 is a storage device that stores programs and data, and includes a RAM (Random Access Memory) and a ROM (Read Only Memory), for example. External memory IF 103 is an interface that performs writing and reading of programs and data to and from an external storage medium (e.g., optical disk, magnetic disk, or semiconductor memory) that stores programs and data. Input module 104 is an input device that inputs instructions or commands from a user to CPU 101, and includes a keypad, buttons, a touch screen or a microphone, for example. Display controller 105 is a device that controls the display device to display information such as images and characters, and includes an image processing circuit and a video signal output circuit, for example. Sound module 106 is a device that outputs an audio signal, and includes an audio processing circuit and an audio signal output circuit, for example. Communication IF 107 is a device that performs communication via a wired or wireless network (e.g., the Internet) in accordance with a predetermined communication standard.

Figure 3:
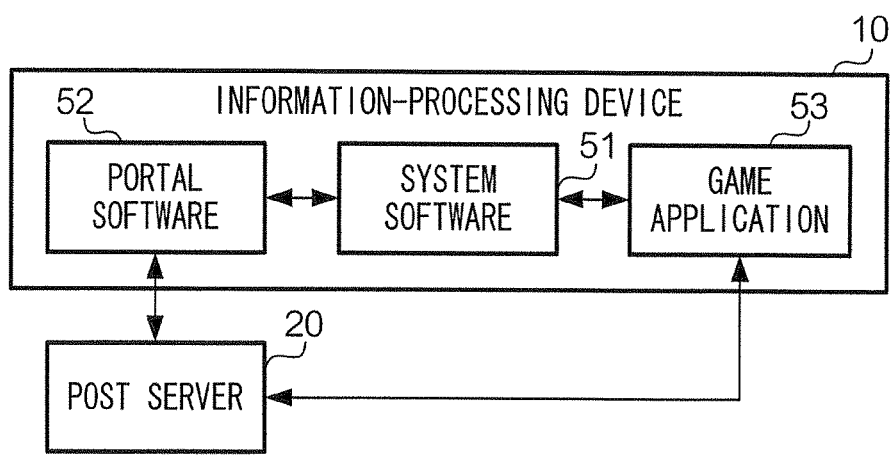
FIG. 3 shows an example a software configuration of information-processing device 10.

FIG. 3 shows an example of a software configuration of information-processing device 10. Information-processing device 10 includes system software 51, portal software 52, and game application 53.

System software 51 is software for managing or controlling information-processing device 10. System software 51 is essential software for executing various application programs in information-processing device 10, and is software that definitely exists in information-processing device 10 when an application program is executed. In this example, system software 51 includes OS (Operating System) 511. OS 511 is basic software for operating application programs such as portal software 52 and game application 53.

Portal software 52 is client software of the posted information sharing service, and provides an interface that presents information to users and receives input of information from users. Portal software 52 transmits a request to post server 20, and controls the display device to display an image of the information sharing service, in accordance with data that is transmitted from post server 20 according to the request. The displayed image of the information sharing service includes one or more items of posted information of one or more users and a UI (User Interface) for inputting and transmitting posted information.

Note that in the case where plural users share information-processing device 10, the user who is active is specified by so-called login processing.

Game application 53 is an application program (software) for causing information-processing device 10 to execute a video game. Information-processing device 10 is capable of executing various game applications 53. Programs for realizing game applications 53 are stored in a storage medium (external memory), for example, and the user executes a desired game application 53 on information-processing device 10, by causing information-processing device 10 to read the program stored in a desired storage medium from among plural storage media that respectively store different programs. In another example, plural programs are stored in memory 102, and the user executes a desired game application 53 on information-processing device 10 by activating a desired program from among the stored programs.

In the present embodiment, system software 51 and portal software 52 are prestored in memory 102 at the point of sale of the information-processing device. That is, system software 51 and portal software 52 are provided as functions of the platform of information-processing device 10. Game application 53 is stored in an external memory. Note that game application 53 may be stored in memory 102.

CPU 101, when executing portal software 52, is an, example of accessing unit 11. CPU 101, when executing OS 511, is an example of application executing unit 12. CPU 101 that is performing game application 53 is an example of identification information transmitting unit 13, result receiving unit 14, and joint processing unit 15.

1-3. Matching Server 30

Referring again to FIG. 1, matching server 30 includes matching unit 31 and result transmitting unit 32. Matching unit 31 matches two or more information-processing devices 10 belonging to the same community, and forms a playgroup (e.g., community) for playing a multiplayer game together. Result transmitting unit 32 transmits the result of matching by matching unit 31 to the matched information-processing devices 10. Matching server 30 is a computer device that includes a CPU, a memory, storage, and a communication interface. The storage stores a program for causing a computer device to function as matching server 30. Matching unit 31 and result transmitting unit 32 are realized by the CPU when executing this program.

2. Operations

Next, operations of information-processing system 1 will be described. In this example, game application 53 is a fighting game in which plural users can participate. Here, processing for determining users to participate in this fighting game will be described, in particular. In this example, users who belong to a given community play against each other in a game. Selection of a community for performing matching from plural communities is performed from game application 53 or portal software 52. Hereafter, an example (operation example 1) in which a community is selected from game application 53, and an example (operation example 2) in which a community is selected from portal software 52 will be respectively described.

Furthermore, an example (operation example 3) in which portal software 52 is called from game application 53 and a community is accessed, and an example (operation example 4) in which a community is accessed from portal software 52 will be described.

2-1. Operation Example 1

Figure 4:
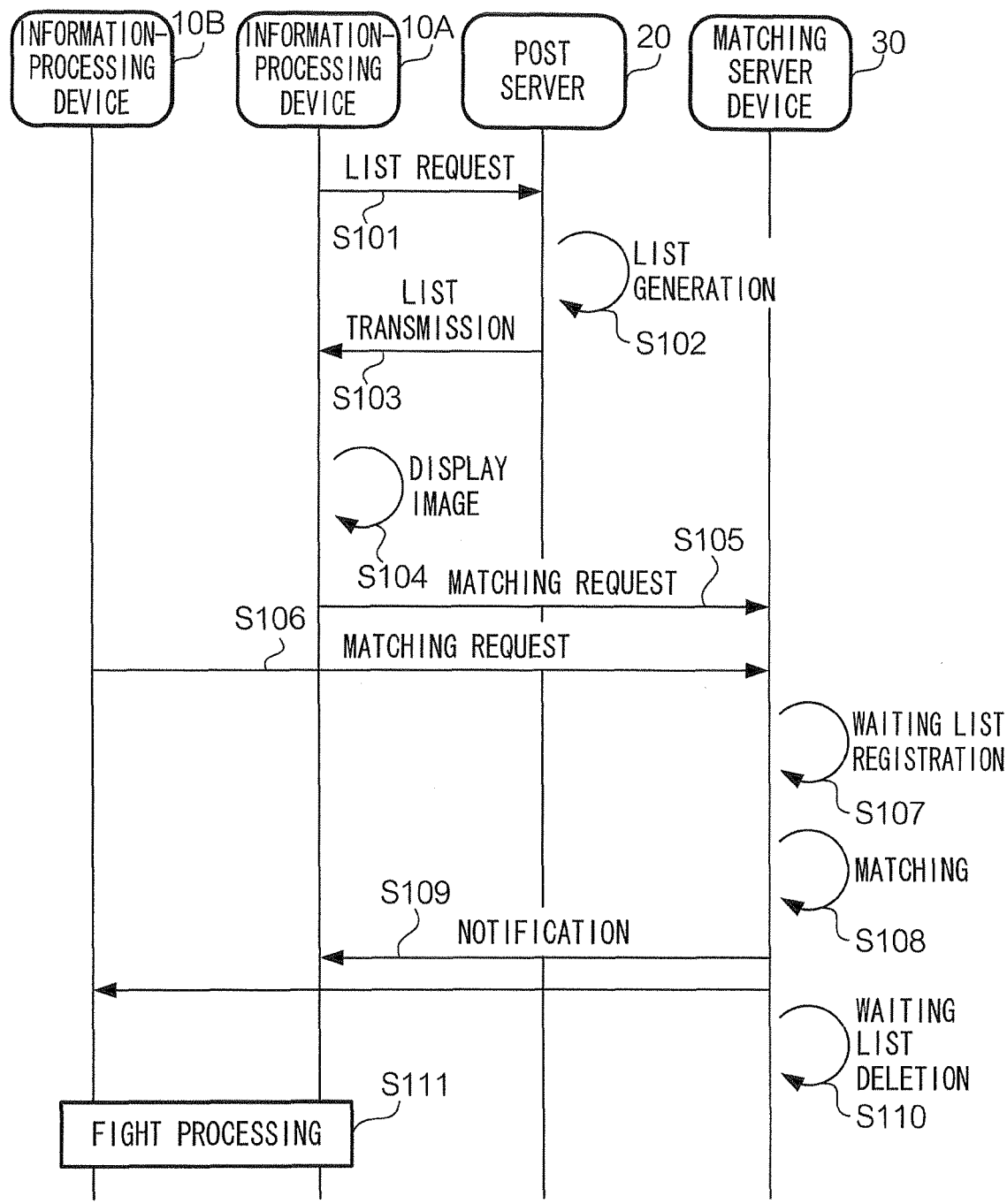
FIG. 4 shows an example of a sequence chart illustrating operations of information-processing system 1 according to operation example 1.

FIG. 4 shows an example of a sequence chart illustrating operations of information-processing system 1 according to operation example 1. At the start of the flow FIG. 4, game application 53 is being executed on information-processing device 10A and information-processing device 10B.

In step S101, information-processing device 10A (to be specific, game application 53; hereinafter, this similarly applies to all of the processing in FIG. 4) transmits a transmission request for a list of communities (hereinafter, "list request") to post server 20. The list request is transmitted as a result of the user performing a predetermined operation on the image of game application 53. The list request includes the user ID of the user of information-processing device 10A. Also, the list request includes identification information of the game application being executed on information-processing device 10A.

When the list request is received, post server 20 refers to user database 211 and community database 213, and extracts communities corresponding to the application identification information included in the list request. Also, communities corresponding to the user ID are further extracted therefrom. Post server 20 generates (in step S102) a list of the extracted communities. This list includes attribute information of the communities, such as the community ID, community name and the number of users who belong to the community, for example. Post server 20 transmits (in step S103) the generated list to the device that transmitted the list request (in this example, information-processing device 10A), in response to the list request.

When the list of communities is received, information-processing device 10A displays (in step S104) an image for prompting a user to select one of the communities included in the list. The user performs operation for selecting one community on this image. Information-processing device 10A transmits (in step S105) a request to determine (match) opponents in the fighting game (hereinafter, "a matching request") to matching server 30. The matching request includes the community ID of the one community selected by the user operation and attribute information of the user of information-processing device 10A. The attribute information in the matching request includes a user ID, a device ID (identification information of information-processing device 10), and progress information indicating the progress status of the game (e.g., cumulative playing time, game level, etc.), for example.

Information-processing device 10B also transmits (in step S106) a matching request to matching server 30, through similar processing to steps S101 to S104 in information-processing device 10A.

When the matching requests are received, matching server 30 registers (in step S107) the attribute information included in the matching requests in a waiting list. A waiting list is a list of users who want to be matched in the fighting game, and is created for each community. That is, the waiting list of a given community includes the user ID of one or more users who want to play against other users in the game, among the users who belong to that community. Note that, as already described above, because a community corresponds to one application program, an application program is also specified if a community is specified.

In step S108, matching server 30 performs processing for matching opponents. Matching processing includes selecting users (opponents) to participate in the fight processing, from the plural users registered in the waiting list. As described above, because a waiting list is created for every community, users with the same community ID as that included in the matching request are matched. The selection of users is performed in accordance with a predetermined algorithm. This algorithm is for selecting a number of users that is at or below a maximum number of users, using a maximum of number of users that can play against each other at the same time and the attribute information of users registered in the waiting list, for example. Note that the processing of step S108 is started at a predetermined timing (e.g., periodically or when matching server 30 receives a matching request from any of information-processing devices 10).

In step S109, matching server 30 transmits, to information-processing devices 10 of the users selected in step S108, a notification indicating that the users to participate in the fight processing have been determined. This notification includes the attribute information of the users who will participate in the fight processing. When this notification has been transmitted, matching server 30 deletes (in step S110) the user IDs of the users who it has been determined will participate in the fight processing from the waiting list.

When receiving the notification indicating that the users to participate in the fight processing have been determined, information-processing devices 10 execute (in step S111) the fight processing. The fight processing includes, for example, processing for transmitting, to matching server 30, parameters relating to playing the fighting game (e.g., parameters indicating movement of own character or attacks by own character on enemies), and processing for receiving, from matching server 30, parameters relating to playing the fighting game that have been transmitted from another information-processing device 10. Information-processing device 10 performs joint processing, using the parameters thus transmitted to and received from another information-processing device 10. Note that the game processing performed after the matching, may be performed by a server other than matching server 30, or may be performed through direct exchange of information between information-processing devices 10.

2-2. Operation Example 2

Figure 5:
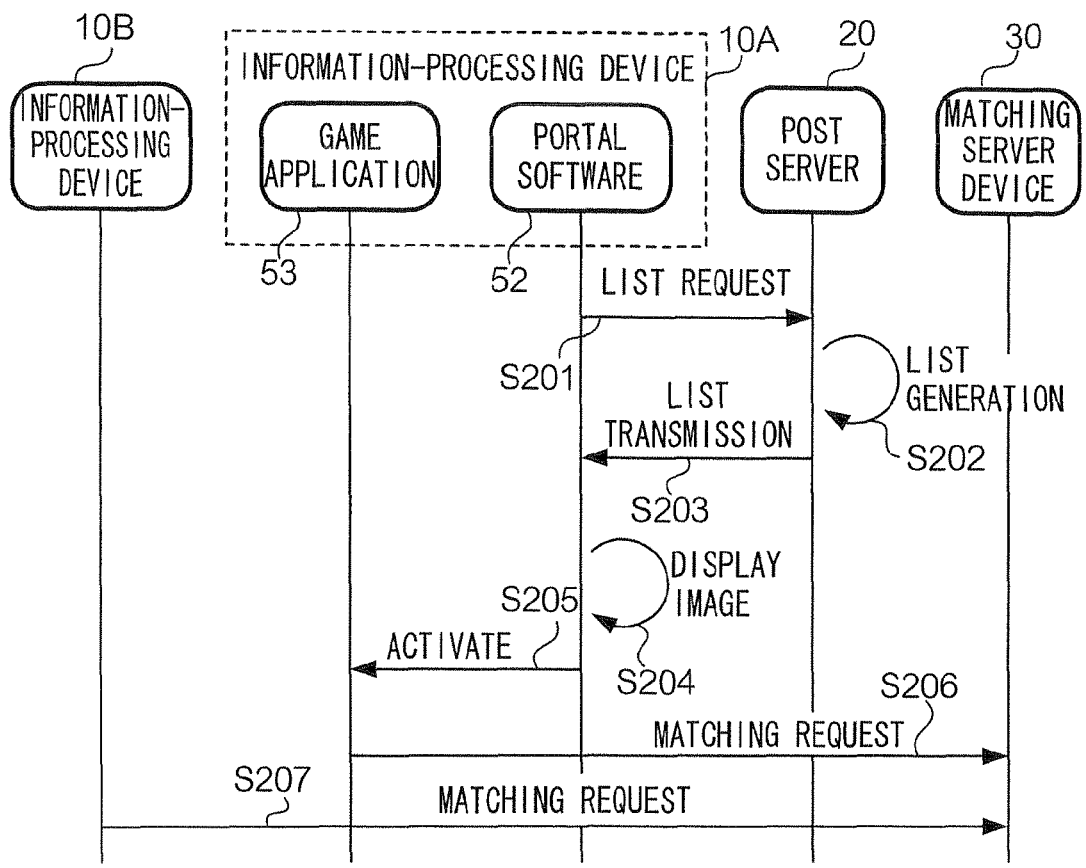
FIG. 5 shows an example of a sequence chart illustrating operations of information-processing system 1 according to operation example 2.

FIG. 5 shows an example of a sequence chart illustrating operations of information-processing system 1 according to operation example 2. At the start of the flow in FIG. 5, portal software 52 is being executed on information-processing device 10A. Note that although, in part of the processing, software such as portal software 52 and game application 53 will be described below as the agent of the processing, this means that CPU 101, when executing the software, executes the processing in cooperation with other hardware.

In step S201, portal software 52 transmits a list request for communities to which the user of information-processing device 10A belongs to post server 20. The list request is transmitted as a result of the user performing a predetermined operation on the displayed image of portal software 52. The list request includes the user ID of the user of information-processing device 10A.

When the list request is received, post server 20 refers to user database 211 and community database 213, and extracts the communities corresponding to the user ID included in the list request. Post server 20 generates (in step S202) a list of the extracted communities. This list includes attribute information of the communities, such as the community ID, community name and number of users that belong to the community, for example. Post server 20 transmits (in step S203) the generated list to the device that transmitted the list request (in this example, information-processing device 10A), in response to the list request.

When the list of communities is received, information-processing device 10A displays in step S204) an image for prompting a user to select one of the communities included in the list.

Figure 6:
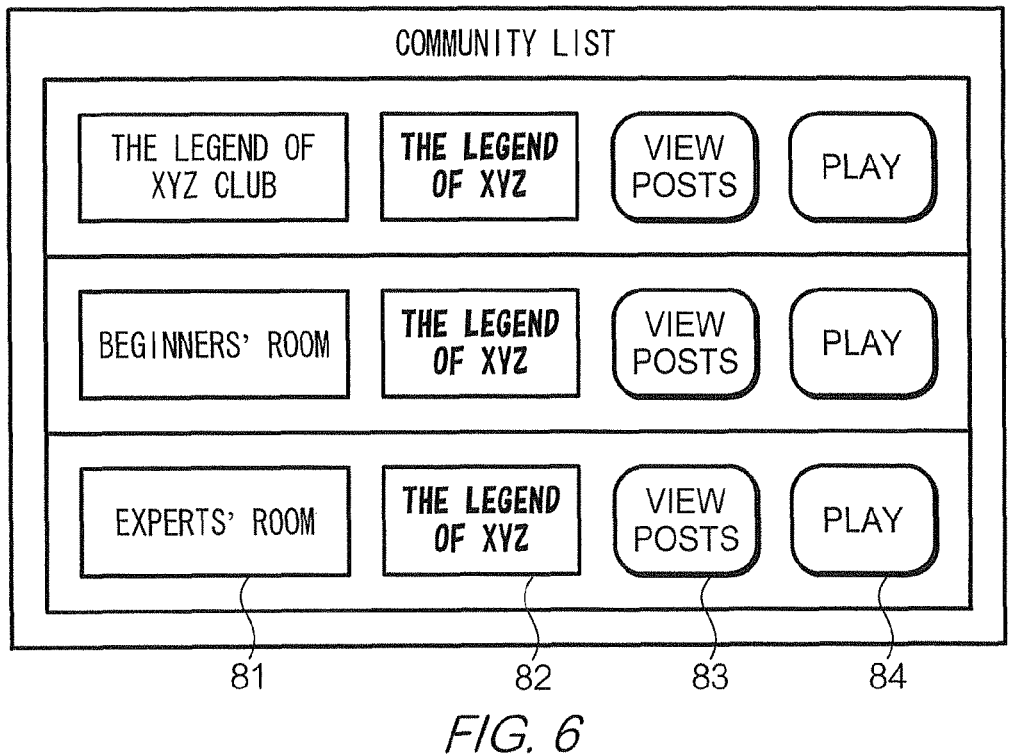
FIG. 6 shows an example of an image displayed in step S204.

FIG. 6 shows an example of an image displayed in step S204. This image includes community name 81, title 82, button 83, and button 84 for each of plural communities. Community name 81 shows the name of the community. Title 82 shows the title of the game corresponding to the community. Button 83 is a button for instructing browsing of the posted information of the community. Button 84 is a button for instructing the start of fight processing in the game corresponding to the community. Three communities, namely, "The Legend of XYZ Club", "Beginners' Room", and "Experts' Room", corresponding to the game "The Legend of XYZ" are respectively shown in the example in FIG. 6.

Referring again to FIG. 5, when button 84 is pressed, portal software 52 activates (starts up) (in step S205) game application 53. To be specific, portal software 52 instructs OS 511 to start up game application 53. This instruction includes an instruction to transmit a matching request after activation, and the community ID of the community to which the pressed button B corresponds. OS 511 activates game application 53, in accordance with the instruction.

When game application 53 has been activated, game application 53 transmits (in step S206) a matching request to matching server 30. The matching request includes the ID of the community selected in accordance with the image of step S204. The user of information-processing device 10B also transmits (in step S207) a matching request to matching server 30 through similar processing to steps S201 to S205 (or through similar processing to steps S101 to S104). The processing performed after transmission of the matching requests is similar to the flow in FIG. 4.

2-3. Operation Example 3

In this example, OS 511 temporarily pauses (interrupts) execution of game application 53 when a specific operation is performed during execution of the game application (e.g., when a specific button among the plural buttons of input module 104 is pressed), and calls a menu image. This menu image is provided as one function of system software 51. This menu image includes an item for instructing activation of portal software 52. When the user selects this item, OS 511 activates portal software 52. The user accesses post server 20 via portal software 52. In this example, game application 53 that was being executed until then is interrupted (suspended) while post server 20 is being accessed after the menu image is called. When a specific operation is performed in the state where game application 53 is suspended, OS 511 resumes execution of game application 53 again.

Figure 7:
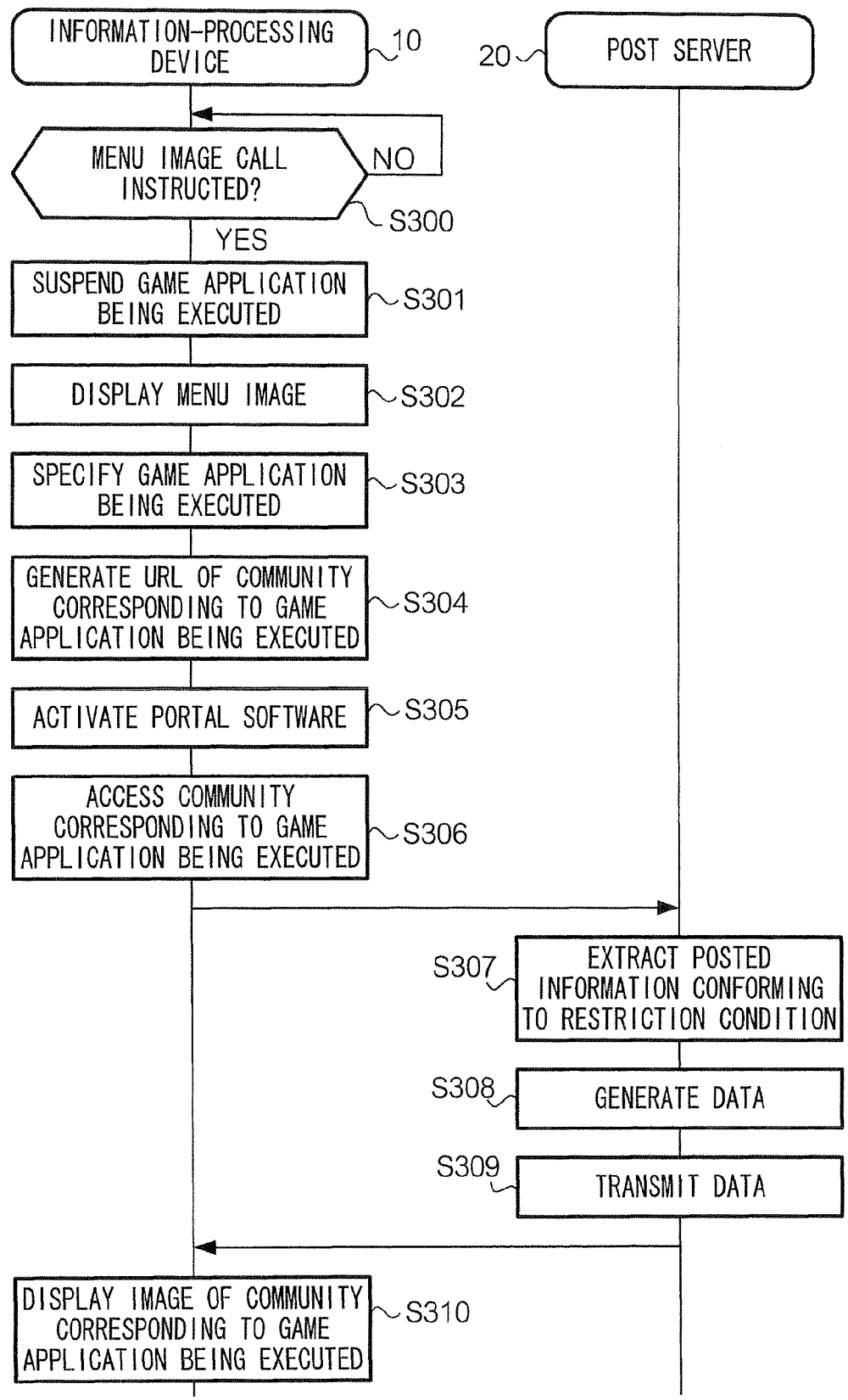
FIG. 7 shows an example of a sequence chart illustrating operations of information-processing device 10.

FIG. 7 shows an example of a sequence chart illustrating operations of information-processing device 10. Although programs such as OS 511 and portal software 52 will be described below as the agents of the processing, this means that CPU 101, when executing these programs, realizes the processing in cooperation with other hardware.

In step S300, OS 511 determines whether calling of the menu image has been instructed during execution of game application 53. OS 511 monitors a specific operation by input module 104 in parallel with execution of the game application, and determines that calling of the menu image has been instructed in the case where the specific operation is performed by input module 104. If it is determined that calling of the menu image has been instructed (step S300:YES), OS 511 shifts the processing to step S301. If it is determined that calling of the menu image has not been instructed (step S300: NO), OS 511 continues execution of game application 53.

In step S301, OS 511 suspends game application 53 that is in an executing status. That is, OS 511 activates another program, with data used in execution of game application 53 expanded in memory 102.

In step S302, OS 511 displays the menu image. This menu image includes an item for instructing the activation of portal software 52. When the user selects this item, OS 511 shifts the processing to step S303.

In step S303, application specification module 512 specifies the application program that was being executed when calling of the menu image was instructed (in this example, game application 53). Specifically, this includes the following. OS 511 reads the application ID of the application program that is in an executing status from memory 102. Next, OS 511 calls application specification module 512. At the time of this call, OS 511 notifies the application ID that has just been read out to application specification module 512. Note that the application ID of the application program that is in an executing status is stored in memory 102 by processing independent to the flow in FIG. 7. To be specific, OS 511, when activating an application program, obtains the application ID from the application program, and stores the application ID of the application program that is in an executing status in memory 102, until the application program is ended.

In step S304, identification information generation module 513 generates a URL (exemplary community identification information) of the corresponding community from the application ID specified by application specification module 512. Identification information generation module 513 has a table, a function or rule information for converting application IDs into URLs, and generates a URL from the application ID with reference to this table, function or rule information.

In step S305, OS 511 activates portal software 52. At this time, OS 511 notifies the URL generated by identification information generation module 513 to portal software 52 as the URL of the community to be accessed at the time of activation.

In step S306, portal software 52 accesses the community indicated by the notified URL. That is, portal software 52 accesses, via access module 514, a resource corresponding to game application 53, which is the application program that is being executed when activation of portal software 52 is instructed (in this example, directory corresponding to the application program that is in an executing status, from among plural directories on post server 20).

When accessing post server 20, access module 514 transmits an access request that includes the application ID and the user ID of the user of information-processing device 10 to post server 20. The user ID is identification information of the user who is logged into information-processing device 10 (user who is using information-processing device 10 at that time). The user ID is specified by so-called login processing, at a predetermined timing such as when information-processing device 10 is started up, for example.

FIG. 8 illustrates data registered in posted information database 212. Plural data sets are registered in posted information database 212. Each data set includes a post ID, a timestamp, an application ID, a user ID, a comment, binary data, and a tag. The post ID is identification information for identifying posted information. The post ID is a number that is automatically allocated by post server 20, in accordance with a predetermined rule (e.g., order in which post server 20 receives posted information). The timestamp shows the time when the posted information was received (or the time when posted). The application ID is identification information that identifies the application program related to the posted information, and, to be more specific, identifies the application program that is being executed on the information-processing device when posting of the posted information is instructed (application in executing status). The user ID is identification information that identifies the user who posted the posted information. A comment is a character string input by the user. Note that characters (image) handwritten by the user or a character string automatically generated by the system may be used instead of a comment or in addition to a comment. Binary data is data that is used by an application program indicated by the corresponding application ID, and, to be more specific, is data generated by the application program. A tag is data that describes other related information. In this example, the tag includes usage information. Usage information is information that is changed or updated cumulatively according to use of the corresponding application program (e.g., cumulative game playing time), or information that changes discontinuously (name of game save point). Note that FIG. 8 is merely intended as an example, and the information included in the posted information is not limited thereto. Some of the information shown in FIG. 8 may be omitted, or information not in FIG. 8 may be added.

Note that progress information indicating the progress status of the application program or the information showing the usage status of the application program may be used, instead of usage information (or in addition to usage information). Usage information, progress information or information showing the usage status is not limited to the cumulative playing time or the save point name that has been illustrated above. In the case where the application program is a game application, usage information, progress information or information showing the usage status may, for example, be the number of times that the game has been cleared, the number of times that the game has been played, the number of times that characters appearing in the game have been defeated, the type of characters appearing in the game, the type of predetermined events that occur in the game, the number of wins or loses in the game, the number of items obtained in the game, the latest number of the cleared stages, the most recent save point, or actual performance (achievement; degree to which various goals that are set to be achieved per game are achieved).

As another example, in the case where the application program is a movie player program, usage information, progress information or information showing the usage status is the number of times that the moving image is played back to the end, the playback length of the moving image, or the number of times that playback of the moving image has been instructed. As a further example, in the case where the application program is a still image (electronic book, cooking recipe, etc.) display program, usage information or progress information is the number of displayed pages, the type of displayed still image, or the number of times that still image display has been instructed.

Referring again to FIG. 7, when the request is received from information-processing device 10, post server 20 refers (in step S307) to the user settings information, and extracts posted information that conforms to the restriction conditions, from the posted information registered in posted information database 212. Specifically, in the case where the application ID included in the access request is "AAA001", for example, posted information including the post IDs "351245", "351243", "351242" and "351241" are extracted from the example in FIG. 8. Posted information that conforms to the restriction conditions is further extracted therefrom. For example, in the case where the restriction conditions are "most recent posted information from users", and "maximum of 3 items of posted information in total", posted information including the post IDs "351245", "351243" and "351241" are ultimately extracted.

Post server 20 arranges the extracted posted information in a predetermined order (e.g., in time series). Post server 20 generates (in step S308) data in which these items of posted information are written in a predetermined data format (e.g., HTML (HyperText Markup Language)). The data generated here includes identification information of the community to which access was requested (hereinafter, "community ID"; the community ID is part of the URL of the community, for example). Post server 20 transmits (in step S309) the generated data to information-processing device 10 that transmitted the access request.

In step S310, portal software 52 displays an image in accordance with the data received from post server 20.

Figure 9:
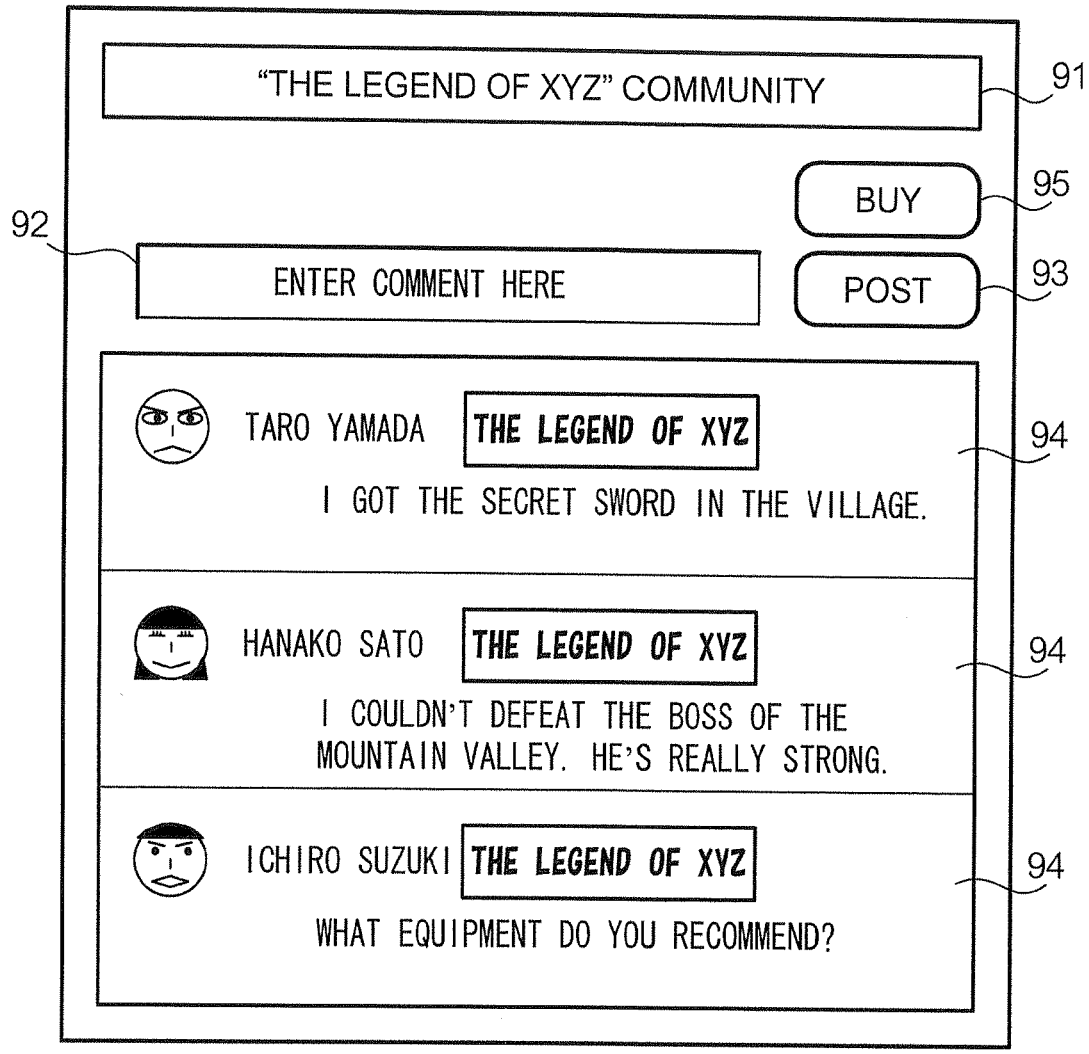
FIG. 9 shows an example of an image of a posted information sharing function.

FIG. 9 shows an example of a displayed image of the posted information sharing service, and, more specifically, shows an example of a displayed image of a communication tool in a given community. This image includes title 91, text box 92, post button 93, plural items of posted information 94, and buy button 95. That is, this image includes a user interface for a bulletin board system function. Title 91 shows the title of the community. In this example, the application program is a program for realizing a video game (game application), and title 91 includes information (at least one of a character string and an image) specifying the application program to which the community belongs. In this example, title 91 shows that this community corresponds to the game "The Legend of XYZ". Text box 92 is used for input of a comment to be posted. Post button 93 is used for inputting an instruction to transmit data such as a comment or the like input to text box 92 to the posted information sharing system (server). Posted information 94 shows posts by users. The details of posted information 94 will be discussed later. Buy button 95 is used for inputting an instruction to access a site where a corresponding application program can be purchased.

Note that the specific display of posted information is not limited to that illustrated to FIG. 9. For example, in FIG. 9, an example is described in which the usage information "53 hrs" is directly displayed. However, portal software 52 may change the display (e.g., shape, color, size) of at least one item included in the posted information, according to the size of usage information or whether or not usage information exists. As an example, portal software 52 may display the user ID using different colors, in the case where there is usage information (in the case of the post of a user who has played the game) and in the case where there is no usage information (in the case of the post of a user who has not played the game). Alternatively, portal software 52 may display an image (mark or icon) indicating whether or not there is usage information.

According to the processing illustrated with the flow in FIG. 7, processing relating to access to post server 20 and processing for providing an UI are executed by system software 51 or portal software 52. That is, even if a user application program is not provided with a function for accessing a posting server, the user can easily access communities corresponding to this user application program. For example, various experiences, both happy and sad, such as acquiring a rare item, clearing a stage, or not being able to progress further, can be shared with other users, when playing the game. Also, developers of application programs are able to reduce development costs involved in implementing a function and a UI for accessing a posting server.

Note that although the case where portal software 52 is activated from a user application program via a menu image was described in this example, portal software 52 may be activated other than via a menu image. In this case, OS 511 activates portal software 52, when a specific operation is performed during execution of game application 53. Also, when the menu image is called, game application 53 that was being executed until then may be terminated rather than being suspended. Also, a device ID (identification information of information-processing device 10) may be used instead of a user ID.

2-4. Browsing Posted Information of Communities

Figure 10:
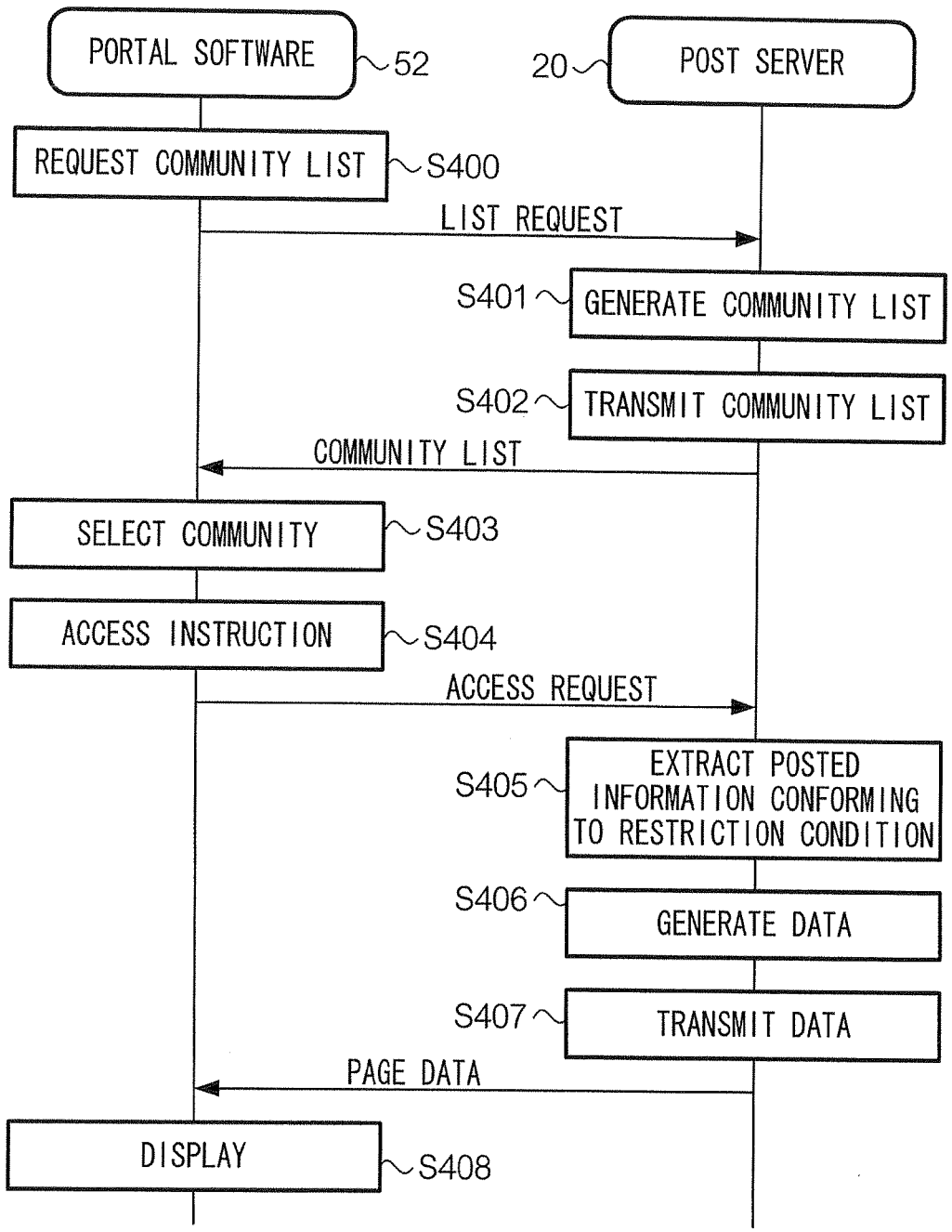
FIG. 10 shows an example of a sequence chart illustrating processing for browsing posted information of a community.

FIG. 10 shows an example of a sequence chart illustrating processing for browsing the posted information of communities. In step S400, portal software 52 transmits a request for a community list to post server 20 via access module 514. This request includes the user ID of the user of information-processing device 10. When the request for a community list is received from information-processing device 10, post server 20 extracts information on the communities to which the user having the user ID included in the request belongs from the data registered in community database 213, and generates a list of the extracted communities (hereinafter, "community list") (step S401).

FIG. 11 illustrates a generated community list. The community list includes a community ID, a title, an application ID, and attribute information. The community ID is identification information for identifying a community (hereinafter, a community subjected for description here will be called a "target community"), and is automatically assigned by the system (post server 20). A title is identification information for identifying a target community, and is input by the creator of the target community. The application ID is identification information for identifying an application program corresponding to the target community. Attribute information indicates attributes relating to the target community. In this example, attribute information includes the creator, the number of members and the URL of the target community. The creator of a target community shows the user ID of the user who created the target community. In this example, there are official communities and user communities. Official communities are communities that are created by the provider of information-processing system 1 (or the provider of the application program). "Official" appears in the Creator column of official communities. User communities are communities created by a user. The number of members shows the number of users belonging to the target community. The URL shows the location of resources provided by the target community. Note that the attribute information may also include information other than that illustrated in FIG. 11, such as requirements for joining the target community, for example.

Referring again to FIG. 10, post server 20 transmits (in step S402) the generated community list to information-processing device 10 that transmitted the request. When the community list is received, portal software 52 displays an image for prompting a user to select a community on the display device. The user selects (in step S403) a community for browsing, using this image. When a community is selected, portal software 52 transmits (in step S404) an access request to post server 20 via access module 514. This access request includes the user ID of the user of information-processing device 10 and the community ID of the selected community.

When the access request for the community is received from information-processing device 10, post server 20 extracts (in step S405) posted information that conforms to the restriction conditions, from the posted information registered in posted information database 212. Post server 20 generates (in step S406) data in which these items of posted information are written in a predetermined format. Post server 20 transmits (in step S407) the generated data to information-processing device 10 that transmitted the access request. Portal software 52 receives the data via access module 514. Portal software 52 displays (in step S408) an image in accordance with the data received from post server 20. The details of steps S405 to S408 are similar to steps S307 to S310.

2-5. Conclusion

As described above, according to the present embodiment, matching of opponents in a game can be performed utilizing communities already formed in a posted information sharing service.

3. Modifications

The technology is not restricted to the embodiment described above. Various modifications can be applied to the exemplary embodiment. Some modifications will be described below. Two or more modifications from among the following modifications may be combined.

In the embodiment, examples in which a community for performing matching of opponents is selected from an image including a list of communities were described in both operation example 1 and operation example 2. However, the image for prompting a user to select a community for performing matching is not limited to an image displaying a list of communities. For example, a button for instructing matching of opponents may be provided in an area corresponding to each piece of posted information on a displayed image including a list of posts of the friends of a given user, and when this button is pressed, the community corresponding to the posted information of that button may be selected as the community for performing matching.

In both operation example 1 and operation example 2, examples were described in which posting server 20, having received a request, generates a list of communities to which the user belongs, and the user selects one community from the list. However, posting server 20 may automatically select one community from among the communities to which the user belongs, and may transmit the community ID and attribute information of the selected community to information-processing device 10 that transmitted the request. In this case, information-processing device 10 transmits a matching request to matching server 30, after checking with the user whether it is okay to perform matching in that community, or automatically without checking with the user.

Although the processing after fight processing is completed was not particularly described in the embodiment, after fight processing is completed, game application 53 may automatically post the results (e.g., winner, score, etc.) of the fight processing to post server 20.

After fight processing is completed, game application 53 may automatically access the community in which matching was performed (community selected on the image displayed at step S104 or S204). In this case, game application 53 holds the community ID of the community in which matching was performed until the fight processing is completed.

Information-processing device 10 is not limited to a console-type game device. Information-processing device 10 may be an information-processing device other than a game device, such as portable game device, a personal computer, a mobile phone, a PDA (Personal Digital Assistant), or a tablet device. Also, the application program executed in information-processing device 10 is not limited to a game application. An application program for realizing a function other than a game, such as a text editing application, a learning application or other practical software, may be executed in information-processing device 10.

The hardware configuration of information-processing device 10 is not limited to an example shown in FIG. 2. A device including any hardware configuration may be used as long as the functions shown in FIG. 1 are implemented.

The sequence charts described in the embodiment are merely intended as an example, and the order of the processing is not limited to that illustrated in the sequence charts.

The device configuration of information-processing system 1 and the division of functions between the devices is not limited to that described in the embodiment. For example, a server may have at least some of the functions described in embodiment as the functions of information-processing device 10. In this case, the constituent elements of the information-processing system are realized by the processing of the processor of a server, the processing of the processor of an information-processing device, or the collaborative processing of the processor of an information-processing device and the processor of a server. The division of processing can be designed through the general technical knowledge of those skilled in the art. Also, post server 20 may be used as the server of this information-processing system, or a different device may be used.

Also, post server 20 and matching server 30 may be realized with a single server device.

The game processing unit may execute a game application through direct communication between plural terminals. Alternatively, a game application may be executed by dividing the processing between plural terminals and a game server.

The group formation unit and the posted information sharing unit may be provided in a single server, or may be divided between plural servers.

The group formation request unit may be provided in the game processing unit, or may be provided in the posted information sharing unit. In the former case, a group formation request is made within a game application. In the latter case, a group formation request is performed within a posted information sharing application.

The application program executed by information-processing device 10 is not limited to that provided by storage media. An application program may be provided by download via a network such as the Internet. Also, the system software of information-processing device 10 may be provided by storage media or download.

What is claimed is:

1. A posted information sharing system comprising:
a client device comprising:
    a display device; and
    at least one first processor configured to:
        execute a posted information sharing program and a game program;
        during the execution of the posted information sharing program, transmit a posted information request for at least one item of posted information, wherein the posted information request includes a group identifier; and
        during the execution of the game program, transmit a group listing request for a list of groups, wherein the group listing request includes an application identifier of the game program; and
a server device comprising:
    a storage device configured to store first data sets, second data sets, and third data sets, wherein each first data set includes an item of posted information and a group identifier, each second data set includes a group identifier and an application identifier, and each third data set includes a user identifier and a group identifier; and
    at least one second processor configured to:
        responsive to receiving the posted information request, select from the first data sets at least one item of posted information corresponding to the group identifier included in the posted information request, and transmit the selected item of posted information to the client device;
        responsive to receiving the group listing request, transmit to the client device a list of groups corresponding to the application identifier included in the group listing request; and
        responsive to receiving a matching request from the client device, select, from the third data sets, a user identifier corresponding to the group identifier included in the matching request, and transmit the selected user identifier to the client device, wherein the at least one first processor is further configured to:
responsive to receiving the selected item of posted information, causing the display device to display the received item of posted information;
responsive to receiving the list of groups, transmit a matching request including a group identifier of a group selected from the received list of groups; and
responsive to receiving the selected user identifier, start an interactive game processing portion of the game program with a user identified by the received user identifier.

2. The posted information sharing system according to claim 1, the at least one first processor is further configured to:
display one or more groups on the display device, the displayed one or more groups being based on the list of groups received from the server device;
prompt a user to select a desired group from the displayed one or more groups; and
specify the selected desired group in the transmitted matching request.

3. The posted information sharing system according to claim 2, wherein the at least one first processor is configured to output the matching request that specifies the selected desired group when the user performs a predetermined operation in a state where posted information of every group in the received list of groups is displayed.

4. The posted information sharing system according to claim 1, wherein
the at least one first processor is configured to execute the game program with other client devices of a group corresponding to the group identifier included in the transmitted matching request,
the at least one second processor being further configured to automatically output, when game play is ended by the client device, posted information that depends on a game result, as posted information of the group, and
to store the output posted information as posted information of the group.

5. The posted information sharing system according to claim 1, wherein
the at least one first processor is further configured to execute the game program with other client devices of a group corresponding to the group identifier included in the transmitted matching request, and
to display the posted information of the group when game play is ended by the client device.

6. The posted information sharing system according to claim 1, wherein the storage device stores, for each user, stored information regarding at least one group of which said each user is a member, irrespective of whether said each user is currently using any client device from which the posted information is being received at the server device.

7. The posted information sharing system according to claim 1, wherein a user who is currently offline is currently not associated with any client device from which the posted information is received at the server device.

8. A non-transitory computer-readable storage medium storing instructions which, when executed by a first computer of a client device, causes the first computer to perform operations comprising:
executing a posted information sharing program and a game program;
during the execution of the posted information sharing program, transmitting a posted information request for at least one item of posted information to a server device, wherein the posted information request includes a group identifier;
during the execution of the game program, transmitting a group listing request for a list of groups to the server device, wherein the group listing request includes an application identifier of the game program;
responsive to receiving a selected item of posted information from the server device, causing a display device to display the received item of posted information, wherein the selected item of posted information is transmitted by the server device in response to the posted information request;
responsive to receiving a list of groups from the server device, transmitting a matching request including a group identifier of a group selected from the received list of groups; wherein the list of groups is transmitted by the server device in response to the listing request; and
responsive to receiving a selected user identifier from the server device, starting an interactive game processing portion of the game program with a user identified by the received user identifier,
and when executed by a second computer of a server device having a storage configured to store first data sets, second data sets, and third data sets, wherein each first data set includes an item of posted information and a group identifier, each second data set includes a group identifier and an application identifier, and each third data set includes a user identifier and a group identifier, causes the second computer to perform operations comprising:
responsive to receiving the posted information request from a client device, select from the first data sets at least one item of posted information corresponding to the group identifier included in the posted information request, and transmit the selected item of posted information to the client device;
responsive to receiving the group listing request, transmit to the client device a list of groups corresponding to the application identifier included in the group listing request; and
responsive to receiving a matching request from the client device, select, from the third data sets, a user identifier corresponding to the group identifier included in the matching request, and transmit the selected user identifier to the client device.

9. An information-processing method executed by a server device, the method comprising:
providing, in at least one storage device, first data sets, second data sets, and third data sets, wherein each first data set includes an item of posted information and a group identifier, each second data set includes a group identifier and an application identifier, and each third data set includes a user identifier and a group identifier;
responsive to receiving a posted information request from a client device executing posted information sharing program, using a processor communicably coupled to the at least one storage device, select from the first data sets at least one item of posted information corresponding to a group identifier included in the posted information request, and transmit the selected item of posted information to the client device;
responsive to receiving a group listing request from the client device executing a game program, transmit to the client device a list of groups corresponding to an application identifier included in the group listing request; and responsive to receiving a matching request from the client device, select, from the third data sets, a user identifier corresponding to a group identifier included in the matching request, and transmit the selected user identifier to the client device.

\* \* \* \* \*